(12) United States Patent
Mann et al.

(10) Patent No.: US 9,492,694 B2
(45) Date of Patent: Nov. 15, 2016

(54) PRESSURE RELEASE DEVICE FOR HOUSINGS WITH FLAMEPROOF ENCAPSULATION WITH POROUS BODY HAVING INTERFERENCE FIT

(71) Applicant: R. Stahl Schaltgerate GmbH, Waldenburg (DE)

(72) Inventors: Ulrich Mann, Schwabisch Hall (DE); Bernd Limbacher, Schwabisch Hall (DE); Helmut Wurz, Niedernhall (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 14/469,226

(22) Filed: Aug. 26, 2014

(65) Prior Publication Data

US 2015/0060445 A1  Mar. 5, 2015

(30) Foreign Application Priority Data

Aug. 27, 2013  (DE) .................. 10 2013 109 261

(51) Int. Cl.
| | | |
|---|---|---|
| *B65D 90/22* | (2006.01) | |
| *A62C 4/00* | (2006.01) | |
| *A62C 3/16* | (2006.01) | |
| *B23P 11/00* | (2006.01) | |

(52) U.S. Cl.
CPC . *A62C 4/00* (2013.01); *A62C 3/16* (2013.01); *B23P 11/005* (2013.01); *Y10T 29/49872* (2015.01)

(58) Field of Classification Search
CPC ......... A62C 3/16; A62C 4/00; B23P 11/005; Y10T 29/49872
USPC ............... 220/88.2, 560.01, 88.1; 169/48
See application file for complete search history.

(56) References Cited

U.S. PATENT DOCUMENTS

| | | | | |
|---|---|---|---|---|
| 1,701,805 | A * | 2/1929 | Lewis ................. | A62C 4/02 138/40 |
| 2,719,583 | A * | 10/1955 | Malick .................... | 137/210 |
| 3,711,259 | A * | 1/1973 | Gurney ..................... | 48/192 |
| 5,215,312 | A * | 6/1993 | Knappe ............. | F16H 57/027 137/197 |
| 2008/0067466 | A1 * | 3/2008 | Kobayashi ........... | F16K 15/063 251/357 |
| 2013/0206759 | A1 * | 8/2013 | Wurz et al. ............. | 220/88.2 |

* cited by examiner

*Primary Examiner* — Fenn Mathew
*Assistant Examiner* — Don M Anderson
(74) *Attorney, Agent, or Firm* — Leydig, Voit & Mayer, Ltd.

(57) ABSTRACT

A pressure release device for a protective housing for flameproof enclosure of electrical operating means. The device includes an accommodating body (18) having a passage (22), and a porous body (24) arranged in the passage (22). The porous body (24) is elastically deformed by means of an interference fit in the passage (22), and thus, reliably supported therein free of flame or spark exiting gaps.

19 Claims, 4 Drawing Sheets

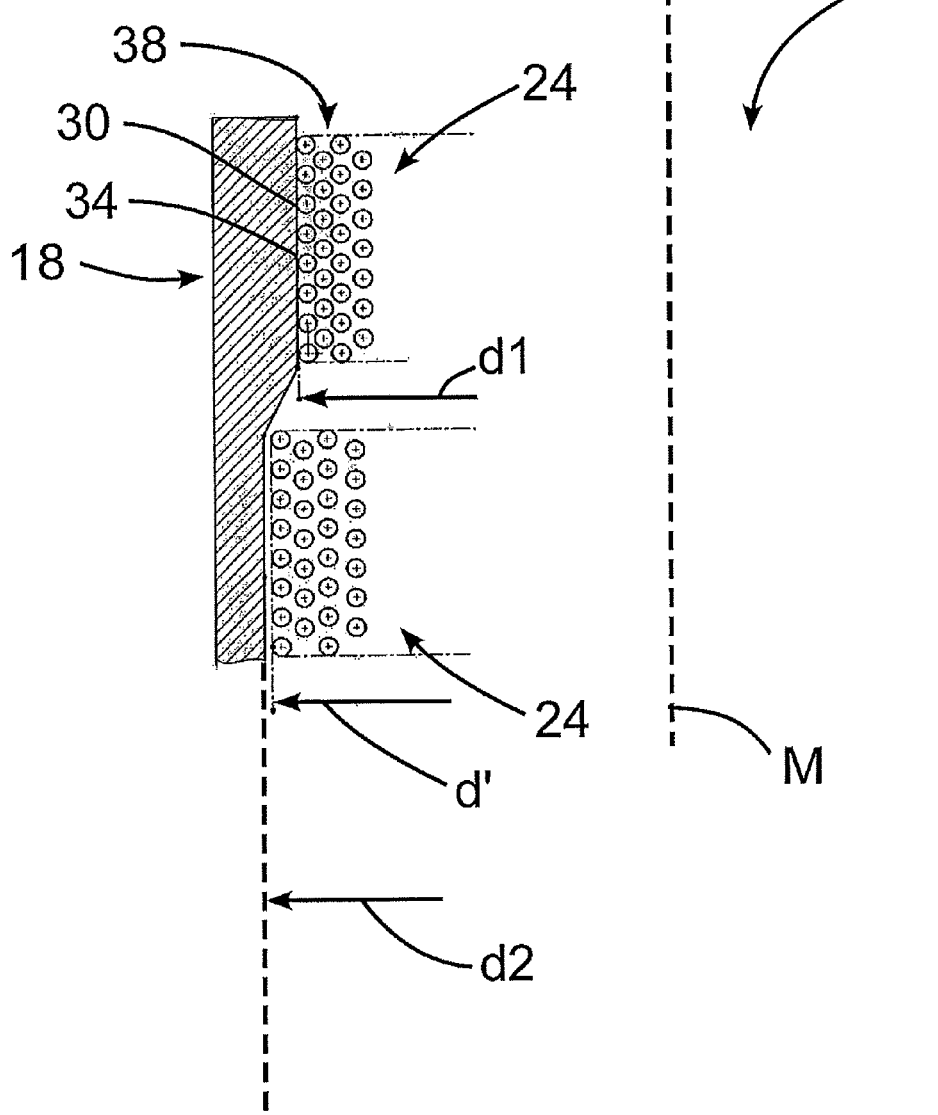

PRESSURE RELEASE DEVICE FOR HOUSINGS WITH FLAMEPROOF ENCAPSULATION WITH POROUS BODY HAVING INTERFERENCE FIT

FIELD OF THE INVENTION

The invention relates to a pressure release device for a protective housing for flameproof enclosure of operating means which can form ignition sources.

BACKGROUND OF THE INVENTION

In the fields of explosion protection flameproof enclosures (Ex-d) represents one type of protection. It is based on enclosing electrical operating means, which can be sources for a spark, such that explosions which occur in the housing interior do not result in flames, hot particles or gases that reach and ignite the outside atmosphere. In such flameproof enclosures, temperatures at locations on the protective housing above the ignition temperature of ignitable gases or dust are furthermore avoided. Overpressure, which is created in the protective housing due to an explosion, with regard to the surrounding area of the housing, also must be reduced safely by compensating with the surrounding area. For cooling the hot gases and for extinguishing potential sparks, provision is thus made for a gas-permeable flameproof passage between the interior of the protective housing and the surrounding area of the protective housing.

DE 10 2010 016 782 A1 describes a pressure release device comprising a porous body, which is arranged in an accommodating body. In its edge area, the porous body comprises a pore closure. The pore closure on the edge side is to prevent the porous body from being bypassed by a flame or hot gases. To embody the pore closure, the publication proposes, for example, to pretension the porous body at its edge against a conical seat of the accommodating body. For this purpose, the publication shows an exemplary embodiment comprising a tire-like body made of soft metal, which is arranged around the porous body and which encloses the latter on the edge side. The accommodating body comprises an internal thread, in which a clamping nut is inserted, with the help of which the force, which is required for forming the preliminary tension, is exerted on the edge area of the porous body. A different example shows an accommodating body comprising an internal thread and a clamping nut, which squeezes the porous material of the porous body on the edge side so that the pores of the porous body collapse. The mentioned embodiments have the disadvantage that the introduction of a thread and of a clamping nut and the closing of the pores of the porous body on the edge side leads to the reduction of the effective cross section for the pressure release device. However, a cross section, which is as large as possible is desired in terms of an effective pressure release. To some extent, the mentioned pressure release device requires extensive production of the porous body and of the accommodating body so as to create the ability to be flameproof, in that the circulation of the porous body is prevented by means of pore closure.

OBJECTS AND SUMMARY OF THE INVENTION

It is an object of the invention to provide an improved pressure release device for a protective housing which provides for an increased gas flow cross section and enables simplified production.

The pressure release device according to the invention for a protective housing for the explosion-proof enclosure of operating means according to the ignition protection type pressure-resistant enclosure (Ex-d) comprises an accommodating body which has a passage and a mating surface. The mating surface is closed in a ring-shaped manner in a peripheral direction, and a porous body is arranged in the passage of the accommodating body. The porous body is free from spark gaps and is thus embodied in a flameproof manner. The porous body comprises an outer peripheral surface and inner and outer passage surfaces. The porous body is elastically deformed to some extent in a direction at right angles to the mating surface or the peripheral direction. In addition, it can also be plastically deformed to some extent. With its outer peripheral surface, the porous body thus adjoins the mating surface along the entire outer peripheral surface. The elastic deformation and non-positive application is attained by means of an interference fit of the porous body with regard to the lateral dimension of the passage of the accommodating body. The application is without gaps in the sense that remaining gaps between the mating surface of the accommodating body and the outer peripheral surface of the porous body are flameproof. Such gaps which might remain are reduced to the extent that flames or sparks cannot penetrate and hot explosion gases or other gases leave the protective housing in a sufficiently cooled manner. Preferably, the interference fit is embodied such that the pores of the body are not collapsed completely even in an edge area of the porous body along the peripheral surface of the accommodating body which adjoins the mating surface so that a gas exchange can also take place through the edge area of the porous body.

Local heat expansions of the accommodating body and/or of the porous body can be compensated reliably due to the press fit or interference fit which is elastic to some extent. In response to the gas exchange, gas flows from the interior of the protective housing through the inner passage surface into the porous body and through the outer passage surface into the surrounding area. A gas flow in reverse direction is also possible. A cross section, which extends across the entire passage cross section of the accommodating body or which utilizes the passage cross section optimally, can be attained by means of the invention for the gas exchange.

The contour of the porous body is adapted to the cross section contour of the passage at the attaching location for the porous body. For example, the porous body as well as the cross section contour of the passage can be circular. Other contours, such as polygons or contours comprising any number of sections, which run straight and/or curved, are also possible. As compared to the state of the art, the design, material, and production effort is reduced. An extensive separate clamping device comprising threads and clamping nuts can be foregone. The pressure release device according to the invention can thus also be embodied in a more compact manner. In particular, the pressure release device comprising the accommodating body and the porous body can be flatter, that is, such that the accommodating body does not extend at all in a passage direction but only slightly across the thickness of the porous body in the passage direction. In the passage direction, the porous body can also comprise an extension, which is as large as or larger than the extension of the accommodating body or of the mating surface in the passage direction.

The production of the porous body is thereby simplified as compared to the state of the art. A pore closure, for example, by means of a ring enclosure of the porous body prior to inserting in the accommodating body is not necessary because of the interference fit. A flameproof arrangement of the porous body in the passage is more simply effected by means of the interference fit without additional means or measures. Additional compensating elements for adapting to thermal expansion are not required.

The method according to the invention for producing a pressure release device for a protective housing for flameproof enclosure of operating means comprises the following steps:

An accommodating body is provided having a passage and a mating surface which runs so as to be closed in a ring-shaped manner in peripheral direction. A porous body is provided which has an outer peripheral surface. At every location of the peripheral surface, the porous body is oversized in the direction at right angles to the outer peripheral surface with reference to the cross section of the passage of the accommodating body at the mating surface.

In a further step, the porous body is elastically deformed to some extent with the help of a suitable aid or tool for reducing the dimension of the porous body at right angles to the outer peripheral surface. In the passage, the porous body is arranged at a mounting location such that the outer peripheral surface rests flat against the mating surface without a spark gap. Due to the allowance for interference of the porous body and due to the partially elastic deformation resulting therefrom, the peripheral surface thereby presses substantially evenly against the mating surface which defines the passage. Without a spark gap is to be understood herein such that gaps can remain between the outer peripheral surface of the porous body and the mating surface of the accommodating body, but that such gaps lead to a sufficient cooling of combustion or explosion gases and to an effective prevention of a flame. The cross sectional surface of a gap which might be present between the accommodating body and the porous body is smaller than or maximally as large as the pore size of the flameproof passage surface in the porous body.

Preferably, the provision of a porous body refers to the detaching of the porous body from porous material having the corresponding thickness. The separating surface thereby forms the peripheral surface of the porous body. A change, in particular a reduction of the porosity and/or of the pore size as compared to the remaining material of the porous body, can take place at the peripheral surface due to an energy input in response to the detaching of the porous body. In the alternative, the porous body can also be sintered into a mold. Preferably, no further method steps take place subsequently for producing the porous body, for example the mounting of an enclosure about the porous body.

The accommodating body can be a component part or an insert, respectively, which is separate from the other wall or from other wall parts of the protective housing. In the alternative, the outer wall or a wall section of an outer wall of the protective housing itself is the accommodating body. The passage of the accommodating body is adapted to connect the interior of the protective housing, in which the operating means are arranged, to the surrounding area of the protective housing for a pressure compensation. The passage comprises a mating surface which forms the contact surface for the porous body. The porous body, which is elastically deformed to some extent, is supported against the mating surface. The mating surface is closed in a ring-shaped manner in a peripheral direction. A surface, which is closed in a ring-shaped manner, is not only understood to be a surface which is closed in a circular manner, but also the surface which is closed in an elliptical, rectangular, polygonal manner or which is curved in any other manner. The mating surface or the inner peripheral surface of the accommodating body, which contains the mating surface, can be inclined at least one location in or opposite to the passage direction. It can thus be conical, for example. However, the mating surface preferably runs axially parallel to the passage direction, thus forming a cylindrical inner jacket surface.

In the case of an exemplary embodiment, the passage can widen in an axial section following the mating surface so that the diameter or cross section of the passage increases in the area of this axial section away from the mating surface. The widening axial section can facilitate introducing the porous body into the passage to the mounting location at the mating surface.

The mating surface can be flat. This refers to a state which is attained by means of mechanical processing, e.g., in the case of which the roughness depth of the surface is maximally as large as the maximum pore cross section of the porous body.

The mating surface, however, can also comprise a random or regular surface structure, for example by means of laser processing or other beams. Such a surface structure can lead to a meshing of the projections of the surface structure with the porous material of the porous body, so that, in a manner of speaking, a "gripping" of the material at the peripheral surface of the porous body with the mating surface is attained. The hold of the porous body in the passage can be improved in that manner. A path, which is sufficiently long for being flameproof, which a spark, for instance, would have to take through the threshold region between the porous body and the mating surface, can furthermore be attained by means of the meshing of the porous body with the surface structure at the mating surface.

The porous body has pores which provide for a gas exchange between the interior of the protective housing and the surrounding area of the protective housing, but which, due to their pore size, that is, their average cross section, their arrangement and their length, lead to an effective extension of the path from the inner passage surface to the outer passage surface. That enables the gas to be cooled effectively on the way. A possible spark is extinguished on the way through the pore body. Pores are not only understood to be unordered, irregularly formed openings and passages, but also tube-shaped passages, which extend axially along the passage direction through the porous body, and have small cross sections.

In a preferred embodiment, the porous body is a randomly oriented composite fiber part. Fibers are arranged irregularly and are at least partially intertwined therein. The pores created by means of the randomly oriented composite fiber are also arranged irregularly due to the irregular arrangement of the fibers and can comprise different cross sections and lengths. As a whole, the pore size of the pores, however, remains below a certain value so that the flameproof enclosure is ensured. Preferably, the fibers have a diameter of at least 70 micrometers and maximally 130 micrometers. Preferably, the pore size in at least one, or in at least two, spatial directions is at least 80 micrometers and maximally 250 micrometers. Preferably, the porosity of the free porous body, that is, the porous body, which is not inserted in the passage, is at least 60% and maximally 80%. Regardless of the embodiment of the porous body, porosity refers to the ratio of the pore volume to the total volume of the porous body.

In a further preferred embodiment, the porous body is produced by means of sintering and preferably consists of powder-sintered material. The porosity of the porous body, which is not inserted and which is not acted upon, is preferably at least 45% and preferably maximally 60%. Preferably, the pore size in at least one or in at least two spatial directions is at least 50 micrometers and maximally 100 micrometers.

In the preferred embodiments, the porous body 24 has a porosity P, which differs from zero at every location. In particular, the porosity P without an impact of external deformation forces on the body is substantially equal everywhere.

The sintered porous body can be produced by sintering particles, such as powder or fibers.

Regardless of the embodiment of the porous body, the minimum thickness, that is the extension of the body from the inner passage surface to the outer passage surface in passage direction, is at least 5 mm to 10 mm.

The porous body preferably consists of a temperature-resistant material. For example, the fibers of the randomly oriented composite fiber consist of a temperature-resistant material. The material is preferably temperature-resistant up to a temperature of at least 400° C. In particular, the structure of the porous body is not changed or is changed only slightly, even in response to high temperatures of up to 400° C. or even above, so that a spark gap is not formed in the passage in any event. The temperature resistance of the used material can ensure, for example, that an adhesion of the pores and/or a loss of the partial elasticity and/or of the stiffness of the porous body does not result when hot gases pass through the porous body.

For example, the material of the porous body can be metal, e.g., steel. Preferably, the body, for example the metal particles or the fibers, are produced from an alloyed steel, in particular from a chromium alloyed steel, for example stainless steel. The porous body, for example its fibers, can also be produced from a different material, for example plastic or ceramic. For example, the randomly oriented composite fiber body can also comprise mixed fibers, that is, fibers of two different materials, for example different metals.

The local porosity of the porous body, which is inserted in the passage of the accommodating body, can decrease radially or in the direction to the mating surface to the outside, respectively. For example, a zone comprising a reduced porosity can be embodied in an edge area of the porous body. Being inserted in the passage, the porous body can also comprise an even, that is, a constant porosity across the entire porous body. The porosity of the loose porous body can be even or uneven across the entire porous body.

In a preferred embodiment, the pressure release device comprising the accommodating body and the porous body need not have an axial seat, stops or other axial holding means for the porous body. In exemplary embodiment, the hold of the porous body in the passage is attained solely by means of the radial deformation or the deformation at right angles to the mating surface.

In another exemplary embodiment, however, at least one axial stop can also be arranged in the passage adjacent to at least one of the two passage surfaces of the porous body and can project inwards at right angles away from the wall, which defines the passage. The axial stop can serve to specify a defined position of the porous body in the passage and can thus represent a positioning aid in response to the insertion of the porous body in the passage. The axial stop can furthermore be equipped as securing means for axially securing the position of the porous body in the passage. The porous body can also be pretensioned against the at least one axial stop. In a preferred embodiment, however, provision is not made for a pretensioning against an axial stop.

Preferably, a gas exchange is possible across the entire cross section, and in particular, also in an edge area of the passage surface. A stop, which serves to secure the porous body against being pushed out of the passage, can also be arranged axially at a distance to the porous body so that a gap remains between the stop and the porous body, whereby the entire passage surface of the porous body is available for the gas exchange.

In a preferred embodiment, the porous body has an edge area with a pore size and/or porosity which is reduced as compared to the pore size and/or porosity of the remaining porous body. In the exemplary embodiment, the edge area of the porous body does not project at right angles to the peripheral direction, for example radially inwardly, beyond the at least one axial stop. The free flow cross section in the passage can be limited by means of the at least one axial stop, in particular if the stop is in the form of a ring-shaped ledge or ring shoulder. In this exemplary embodiment, it is ensured that the edge area having a reduced pore size and/or porosity does not project beyond the axial stop into the free flow cross section of the passage. At least the gas volume flow through the passage and the porous body, which is determined by the free flow cross section and pore size and/or porosity of the body outside of the edge area is thus ensured.

In an exemplary embodiment, the porous body can also include gas-impermeable sections. For example, the porous body can comprise a sleeve which can consist of soft metal, e.g., at an outer peripheral surface of the porous material. The porous body comprising the porous material and the sleeve is deformed elastically to some extent and plastically to some extent and is inserted in the passage by forming a press fit. The sleeve nestles up against the mating surface of the passage without a spark gap. Preferably, the porous body, however, consists completely of a uniform material.

Other objects and advantages of the invention will become apparent upon reading the following detailed description and upon reference to the drawings, in which:

BRIEF DESCRIPTION OF THE DRAWINGS

FIG. 3b is a top view of the pressure release device shown in FIG. 3a;

FIG. 4b is a schematic depiction of a section of the passage of pressure release device that accommodates a porous body.

Figure 1:
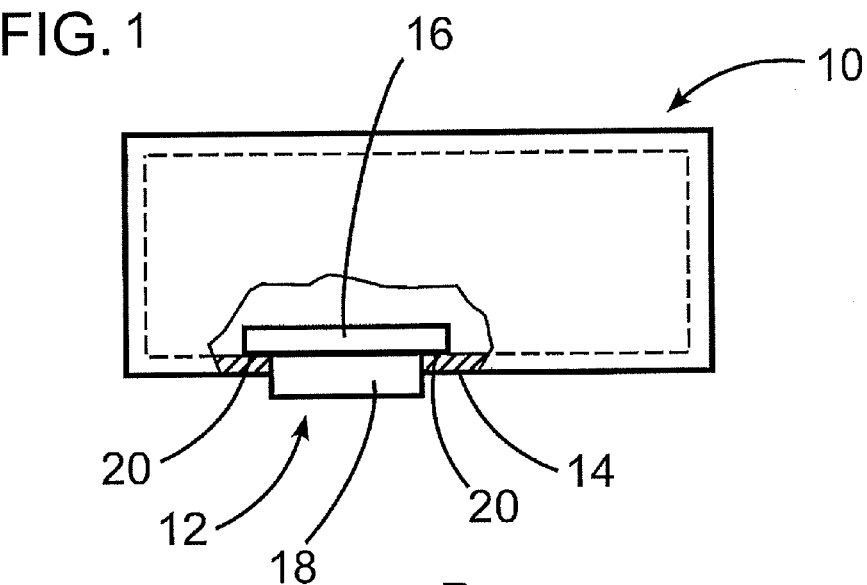
FIG. 1 is a schematic plan view of a protective housing for flameproof enclosure of electrical operating means with a pressure release device in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to FIG. 1 of the drawings, there is shown an illustrative explosion-proof protective housing (10), which in this case is in the form of an ignition protection type "flameproof enclosure" (Ex-d). In the protective housing 10, operating means are arranged so as to be separated from the surrounding area of the protective housing such that an explosive atmosphere in the surrounding area cannot be ignited by means of an ignition source, which is formed by the operating means. The operating means are electrical and/or electronic operating means, for example, e.g. relays.

The protective housing 10 has a pressure release device 12 which in this case is inserted in a wall section 14 of the protective housing 10. The protective housing 10 can also comprise a plurality of pressure release devices 12. The pressure release device 12 has a gas-permeable passage 22 which provides for a flameproof gas volume flow between the interior of the protective housing 10 and the surrounding area. According to the example, the pressure release device 12 has a flange 16 and an accommodating body 18. The accommodating body 18 has a basic cylindrical shape and the passage 22 extends completely through the accommodating body 18. The pressure release device 12 can optionally be sealed against the wall section 14 of the protective housing 10 by means of a seal at the flange 16. It can thus be ensured that an IP protection type of the protective housing 10 is adhered.

FIG. 2 shows a cross sectional view of the pressure release device 12 according to FIG. 1. A porous body 24 is inserted in the passage 22. The porous body 24 comprises an inner passage surface 26, an outer passage surface 28 and an outer peripheral surface 30. The peripheral surface 30 connects the two passage surfaces 26, 28. In the case of the exemplary embodiments described herein, the porous body 24 is circular, as viewed in top view onto one of the two passage surfaces 26, 28. However, it can also comprise different peripheral contours.

According to the example, the peripheral contour of the porous body 24 is adapted to the cross sectional contour of at least the section of the passage 22 comprising the mounting location at which the porous body 24 is arranged in the passage 22. According to the example, the peripheral contour of the porous body 24 is a centric elongation of the cross sectional contour at the mounting location which can have a positive elongation factor. The porous body 24 thus can be oversize as compared to the passage 22 at the mounting location. For example, the porous body 24 is a cylindrical disk and the cross sectional contour at the mounting location is circular. As long as it is ensured that the outer peripheral surface 30 rests against the mating surface 34 along the entire periphery of the body 24 without a gap, the peripheral shapes of the porous body 24 and of the passage 22, however, can also differ. For example, the porous body 24 can be slightly elliptical, while the passage 22 comprises a circular cross section.

The porous body 24 rests against a section of an inner peripheral surface 32 of the accommodating body 18 along its entire outer periphery 30. This section of the inner peripheral surface 32 of the accommodating body 18 forms a mating surface 34 for the porous body 24. The mounting location for the porous body 24 is thus located at the mating surface 34. A mechanical pressing force or tension caused by a partially elastic deformation of the porous body 24 at right angles to the mating surface 34 acts on the latter. This pressing force or tension is brought about in that the porous body 24, prior to insertion in the passage 22, has a dimension d', which is larger than the corresponding dimension d of the passage 22 at the mating surface 34. In the state in which an outer force is not acting on the porous body 24, the latter thus comprises an allowance for interference at every location of the outer peripheral surface 30 in a direction at right angles to its outer peripheral surface 30 as compared to the dimension of the passage 22 at right angles to the mating surface 34. Due to the interference, a non-positive fit or a connection, respectively, of the porous body 24 is attained in the passage 22. In the case of the exemplary embodiment illustrated in FIG. 2a, this non-positive connection is the only means for connection between the accommodating body 18 and the porous body 24. In response to an explosion in the interior of the protective housing 10, the non-positive connection withstands the force of the explosion due to the allowance for interference between the porous body 24 and the cross section of the passage 22 at the mating surface 34. Further positive or firmly bonded connections are not present in the embodiment illustrated in FIG. 2a.

The porous body 24 is arranged in the passage 22 without a spark gap. It presses with its outer peripheral surface 30 flat against the mating surface 34, whereby the formation of spark gaps is prevented. The porous body 24 has a porosity and/or pore size, which ensures a sufficient cool-down of hot gases in response to passing through the porous body 24 and an extinguishing of potential sparks.

Figure 2A:
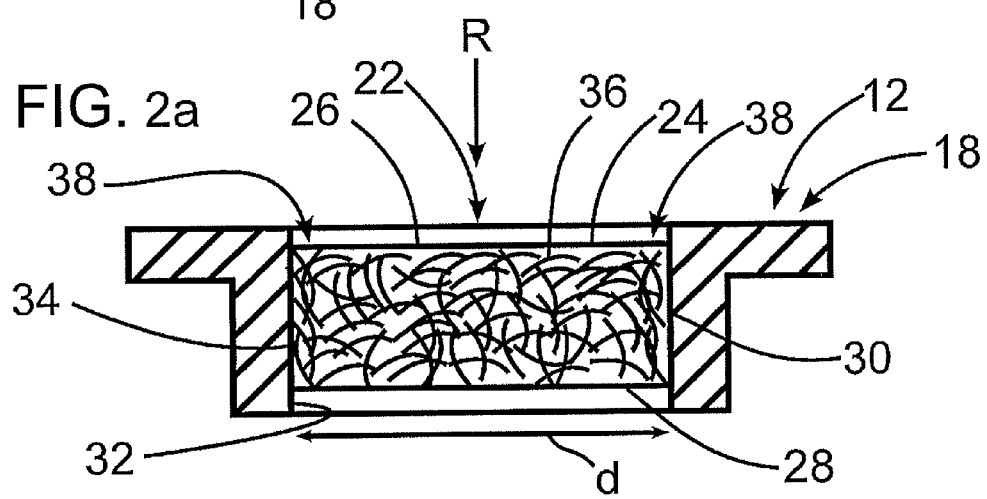
FIG. 2a is an enlarged section of one embodiment of pressure release device shown in the housing of FIG. 1.

The porous body 24 illustrated in FIG. 2a is a randomly oriented composite fiber part. According to the example, it consists of individual metallic fibers 36 which are arranged irregularly and intertwined in the porous body 24. For example, the individual fibers 36 can also be connected to one another by means of a sintering process. Due to the randomly oriented fiber structure in which individual fibers 36 support one another, the porous body 24 has a certain elasticity and can thus be deformed elastically to a certain extent at right angles to the outer peripheral surface 30 to dimensions smaller than or equal to the dimensions of the passage 22 at the mating surface 34, for example the diameter d.

In the exemplary embodiment according to FIG. 2a, the porosity P of the porous body 24 is at least 60% to maximally 80%. The maximum pore diameter can be at least 80 micrometers to maximally 250 micrometers. According to the example, the fibers 36 have a fiber diameter of at least 70 micrometers and maximally 130 micrometers.

Figure 2B:
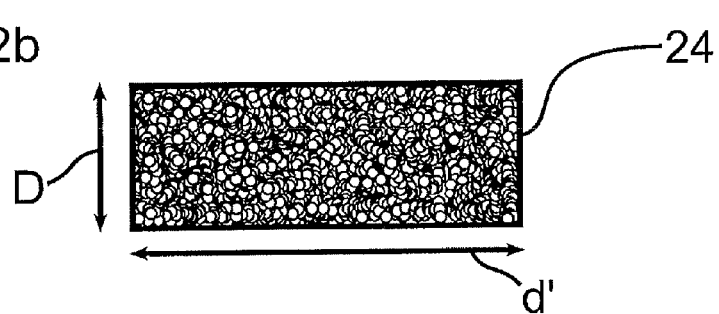
FIG. 2b is a schematic of an exemplary embodiment of a porous body for a pressure release device made of sintered material.

FIG. 2b illustrates a porous body 24 which is not impacted by external forces and which comprises an initial diameter d', whereby the amount of this initial diameter d' is larger than the diameter d of the passage 22 at the mating surface 34. The porous body 24 thus is oversized based on the mating surface 34 of the passage 22.

In the embodiment according to FIG. 2b, the porous body 24 consists of sintered metallic material, in particular powder, and comprises a porosity P of at least 45% and maximally 65%, for example. According to the example, it has a pore size of at least 50 micrometers to maximally 100 micrometers in at least one or two spatial directions parallel to the plane in which the average surfaces 26, 28 extend.

Regardless of the embodiment, the material of the porous body 24 is preferably temperature-resistant for temperature up to at least 400° C.

Regardless of the embodiment, the porosity in an outer edge area 38 of the porous body 24 adjoining the peripheral surface 30 can be smaller than in the remaining porous body 24, as is illustrated in FIG. 2a. In the case of the randomly oriented fiber body 24 of FIG. 2a, the fibers 36 are clustered somewhat more tightly. However, a gas exchange, in which a porosity of greater than zero also prevails in the edge area 38, is preferably nonetheless possible across the entire dimension or across the entire cross section of the passage 22. The resulting distance for a gas which flows through the labyrinth of the pores of the porous body 24 in the edge area 38 is at least exactly as long as in the area of the porous body 24 which lies radially further inwardly so that it remains ensured that the pressure release device 12 of the protective housing 10 is flameproof. The resulting distance for a gas which flows through the porous body 24 is also determined by the thickness D of the porous body 24, which, according to the example, is at least 5 mm to 10 mm.

The mating surface 34 of the accommodating body 18 is preferably flat, that is, it comprises a roughness depth, which is smaller than the maximum lateral pore dimension, e.g., the pore diameter. However, it can also comprise even and uneven structures, for example grooves, which effect a meshing or catching of the material at the peripheral surface 30 of the porous body 24 with the mating surface 34.

In FIG. 2a, the inner peripheral surface 32 of the accommodating body 18 has a cylindrical basic shape of a circular cross section. However, it can also be of different shapes, for example comprising a polygonal, square or rectangular periphery or a periphery, which is curved in another manner. The inner peripheral surface 32 of the accommodating body 18 can also taper conically in sections or as a whole in or opposite the passage direction R. For example, the mating surface 34 can taper conically in passage direction R from the interior of the protective housing 10 to the surrounding area of the protective housing 10. The outer peripheral surface 30 of the inserted porous body 24 thus also tapers in passage direction R. An additional positive connecting component is attained through this, which can lead to additional mechanical stability of the pressure release device 12 in response to a pressure rise in the interior of the protective housing 10.

A conical tapering of at least one section of the inner peripheral surface 32 following the mating surface 34 can also serve as aid for facilitating the insertion of the porous body 24 in the passage 22.

Figure 3A:
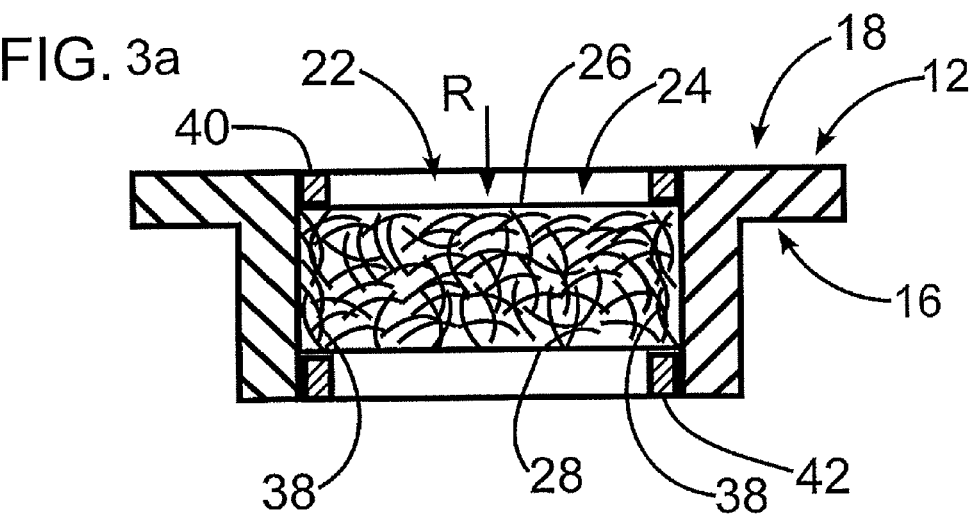
FIG. 3a is a section of an alternative embodiment of a pressure release device in accordance with the invention.

FIG. 3a shows a further exemplary embodiment of a pressure release device 12 having a porous body 24 which is inserted in a passage 22. In contrast to the exemplary embodiment from FIG. 2a, a ring-shaped stop 40 is present in the passage 22 of the accommodating body 18 on at least one side of the porous body 24 and, according to the example, on the side of the inner passage surface 26. The stop 40 forms a ring stage and reduces the diameter or cross section, respectively, of the passage 22 relative to the mating surface 34. The stop 40 can be an integral part of the accommodating body 18 and can be connected to the accommodating body 18 from the same material without a seam or joint. As an alternative, the stop 40 can also be connected to the accommodating body 18 in a firmly bonded manner, for example.

Figure 4A:
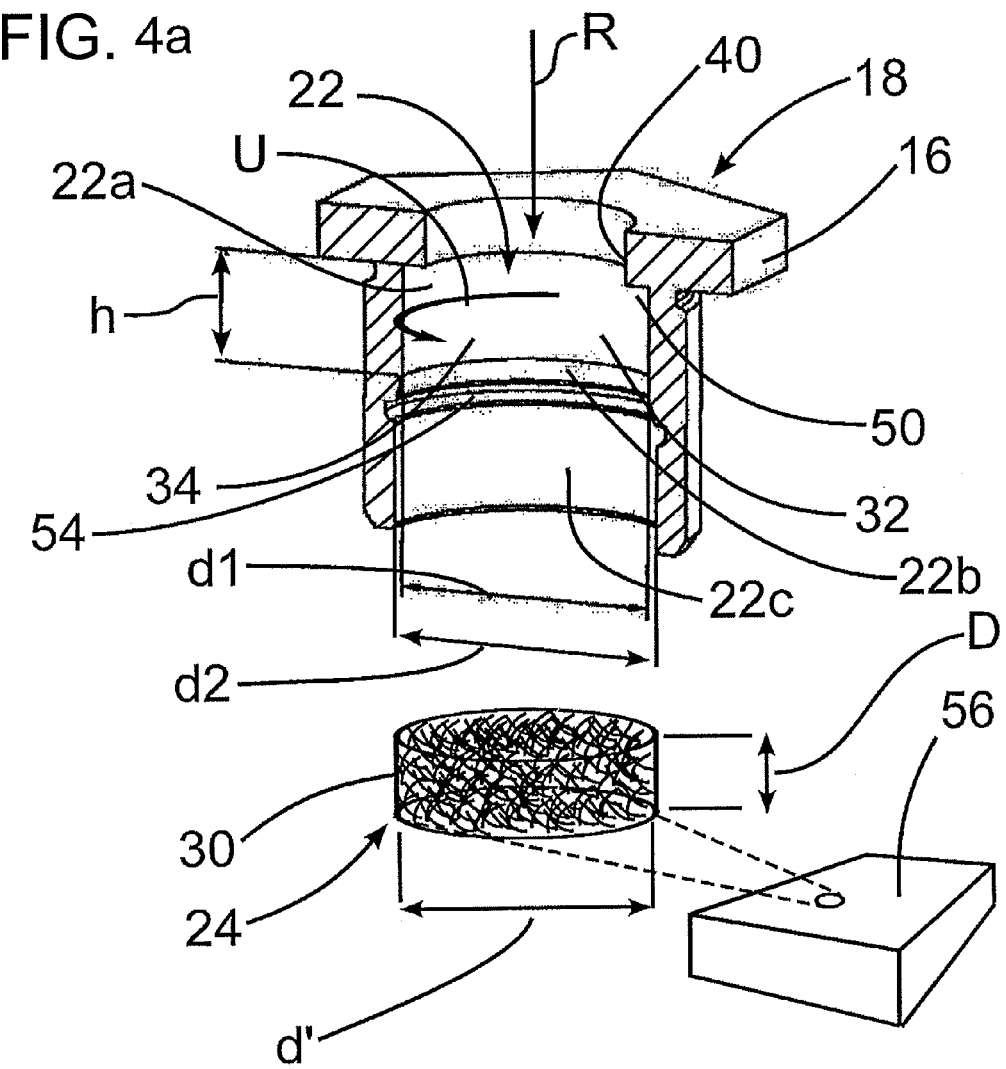
FIG. 4a is an exploded perspective of a further embodiment of a pressure release device according to the invention.

The stop 40 can also be formed by an appendage of the flange 16 which projects into the passage 22 and covers an edge section 50 of the passage 22 (FIG. 4a).

On the side of the outer passage surface 28, which is located opposite the stop 40, a ring nut 42 can be screwed into an internal thread in the passage 22—as is illustrated in FIG. 3a. The porous body 24 can be clamped against the stop ring 40 with the help of the ring nut 42 or can only be secured against being displaced in the passage 22 without axial application of force. The ring nut thus represents either a clamping means for axially impacting the porous body 24 or a securing means. Such a ring nut 42 could also be present, instead of the immovably fastened stop 40, on both sides of the porous body 24.

In and/or opposite the passage direction R, an additional positive securing or clamping is thus also created between the porous body 24 and the accommodating body 18 by means of the described embodiment alternatives.

The stop ring 40 or the ring nut 42 in each case cover a section of the assigned passage surface 26, 28 on the edge side. In the edge area 38 of the porous body, the porosity and/or pore size is somewhat smaller as compared to the remaining porous body due to the partially elastic deformation of the porous body, as already described. Viewed at right angles to the peripheral surface 30, the stop ring 40 and/or the ring nut 42 do not project beyond the edge area 38. The gas flow through the porous body 24 outside of the edge area 38 is thus not obstructed by the stop 40 and/or the ring nut 42.

Figure 3B:
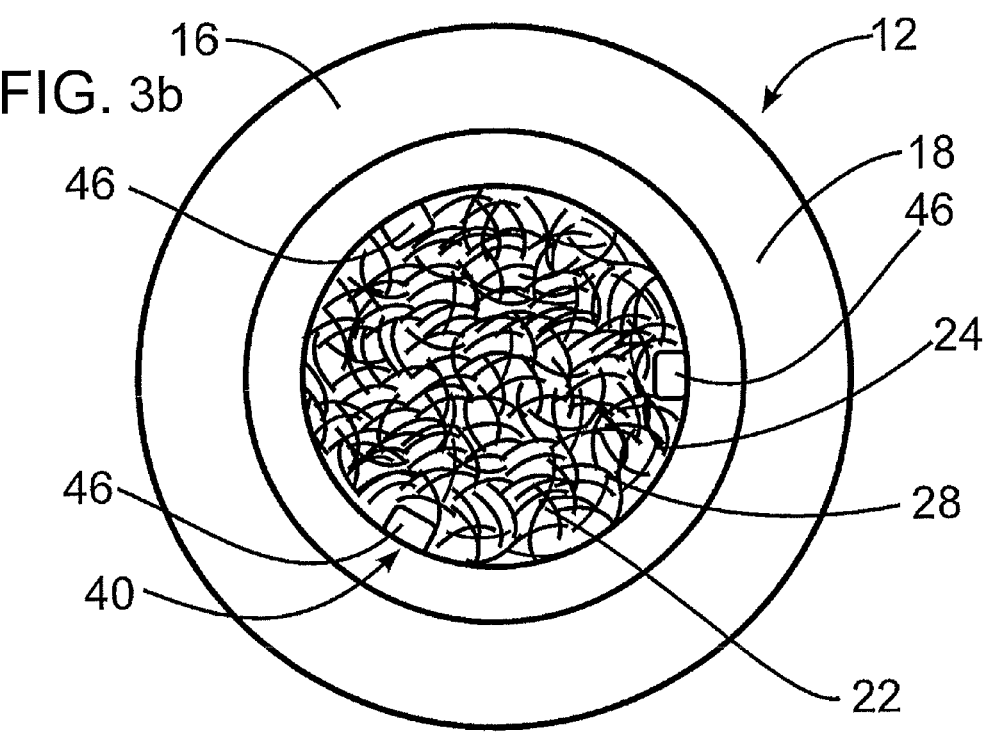

The exemplary embodiment according to FIG. 3b shows a pressure release device 12 comprising an accommodating body 18 and an inserted porous body 24, with a stop 40 in the form of at least three projections 46, which are spaced apart from one another in peripheral direction, upstream of the outer passage surface 28 of the porous body 24. These projections 46 ensure an additional mechanical securing without noticeably limiting the cross section of the passage 22. The gas flow through the porous body 24 is thereby also ensured predominantly in the edge area 38 and is slightly limited only at the locations at which the projections 46 are located.

FIG. 4a shows a further embodiment of the pressure release device 12 in cross section. An exemplary embodiment for methods for producing the pressure release device 12 can also be understood in relation to FIG. 4a.

As explained, the flange 16, which is present at the accommodating body 18, forms the stop 40 for the porous body 24 which is to be inserted. In a cylindrical first section 22a following the stop 40, the passage bore 22 comprises a first diameter d1. The first section 22a has an axial extension or length h in passage direction R. In the area of the first section 22a, the inner peripheral surface 32 forms a mating surface 34 for the porous body 24, which is closed in a ring-shaped manner in peripheral direction U. A conically widening second section 22b follows the first section 22a. Adjacent to this, a ring-shaped groove 54 is formed in the wall of the passage 22 on the side comprising the larger diameter of the second section 22b. The third section 22c of the passage 22, which follows the groove 54, has a second diameter d2. The accommodating body 18 has a passage direction R.

The porous body 24 can be detached from a flat base material part 56 of randomly oriented fiber material. Possible separating methods for detaching a porous body are, for example, laser, plasma or water jet cutting or punching. In the case of some of the separating methods, a structure change, for example a melting, can take place in particular in an edge zone of the porous body 24, for example on the outer peripheral surface 30. For example, fibers can melt with one another or can form firmly bonded connecting locations. The undeformed porous body 24 comprises an initial diameter d', which is larger than the first diameter d1 of the passage 22. The loose porous body 24 accordingly is oversized as compared to the mating surface 34 of the passage 22. The allowance for interference refers to a dimension of the passage 22 at right angles to a passage direction R of the accommodating body 18. The second diameter d2 of the third section 22c is preferably at least as large as the initial diameter d' of the porous body 24.

In an exemplary embodiment the loose porous body P has an initial diameter d'=24.8 mm, for example, while the first diameter is d1=24.5 mm.

In mounting the pressure release device 12, the porous body 24 is initially inserted in the third section 22c of the passage 22 comprising the diameter d2. The porous body 24 is then inserted further into the second section 22b, whereby it is compressed and deforms. The tapering of this second section 22b serves as aid for deforming the porous body 24. The porous body 24 is moved further across this second section 22b, until it finally rests against the mating surface comprising the first diameter d1 in the first section 22a and is held at that location in a non-positive manner. According to the example, the porous body 24 is pushed up to the stop 40.

The thickness D of the porous body 24 can correspond to the axial extension h of the first section 22a and thus of the mating surface 34, or can also be smaller. A securing means—as an alternative to the securing nut 42—for example a snap ring, can be inserted in the groove 54. The porous body can be prevented from slipping out of the passage 22 opposite the passage direction R by means of such a securing means. Optionally, a firmly bonded connection can also be used for securing purposes, for example by adhesion.

FIG. 4b is a schematic diagram illustrating the deformation of the porous body 24 in response to insertion in the passage 22. Due to the interference fit, the porosity P and/or the pore side locally in an edge area 38 of the porous body 24 in the inserted, partially elastically deformed state is smaller due to more tightly clustered porous material, than in the remaining areas of the porous body 24. In the edge area 38, the porosity P and/or the pore size increases at right angles away from the outer peripheral surface 30 inwardly to the center M of the porous body 24. Outside of the edge area 38, the porosity P and/or the pore size is substantially even.

The porous body 24 illustrated in FIG. 4a is a cylinder disk. The design of the body 24 is thus adapted to the cylindrical passage bore. However, as described, the porous body 24 can also comprise a peripheral shape, which differs from the peripheral shape of the passage 22. Due to the radial crimp connection due to the partial elastic deformation at right angles to the mating surface 34, relatively rough tolerances in the production of the passage 22 and of the porous body 24 furthermore also lead to a secure connection of the porous body 24 in the passage 22.

A sealing of the accommodating body 18 against the wall of a protective housing without any gaps can be attained, for example, by means of a flat sealing ring, which is placed into a sealing groove which revolves at the flange 16.

As an alternative to the illustrated embodiments, the wall section 14 of the protective housing 10 can also serve directly as an accommodating part. The passage 22 can thereby be present as hole directly in the wall section 14. The porous body 24 is located directly in the passage 22 in the wall section 14 and is also held by means of the interference fit. The different above-described alternatives for axially securing the porous body 24 can also be used.

From the foregoing, it can be seen that an accommodating body 18 is provided which is adapted to receive a porous body 24 in a passage of the accommodating body according to the invention. The porous body 24 is elastically deformed to a certain extent by means of an interference fit in the passage 22. The porous body 24 is thus supported against a mating surface 34 of the accommodating body 18 along its periphery and is thereby held securely in the passage 22. The arrangement is closed in terms of the ignition protection type flameproof enclosure by the positive abutting of the porous body 24 on the mating surface 34 along its periphery.

LIST OF REFERENCE NUMERALS 10 protective housing
12 pressure release device
14 wall section
16 flange
18 accommodating body
20 seal
22 passage
22a first section of the passage
22b second section of the passage
22c third section of the passage
24 porous body
26 inner passage surface
28 outer passage surface
30 outer peripheral surface
32 inner peripheral surface
34 mating surface
36 fiber
38 edge area
40 stop
42 clamping nut
46 projection
48 stop ring
50 edge section
54 groove
56 storage body of randomly oriented fiber material
58 sealing groove
d diameter of the passage
R passage direction
U peripheral direction
d' initial diameter
D thickness of the porous body
M center of the porous body
P porosity

The invention claimed is:

1. A pressure release device (12) for a protective housing (10) for flameproof enclosure of operating elements which can form ignition sources, comprising:
an accommodating body (18) having a passage (22) extending through the accommodating body (18) that defines a ring shaped mating surface (34) extending through the accommodating body (18),
a porous body (24) made of a material that defines pores throughout arranged in the passage (22) having an inner side assigned to an interior of said housing and an outer side assigned to a surrounding area of the housing,
said porous body (24) initially being oversized in relation to a radial direction to the ring shaped mating surface (34) of said passage (22) and mounted within said passage (22) with an interference fit of the porous body (24) with the mating surface (34) that radially deforms a perimeter of the porous body and facilitates its retention in the passage (22), and
said material of said porous body (24) being radially elastically deformed about its outer periphery in a direction at right angles to the mating surface (34) due to the interference fit such that an edge area (38) of the porous body (24) has a smaller porosity than a central area thereof.

2. The pressure release device (12) of claim 1 in which said accommodating body (18) is a wall (14) of a protective housing (10).

3. The pressure release device (12) of claim 1 in which said mating surface (34) is an even surface.

4. The pressure release device (12) of claim 1 in which said mating surface (34) is conical.

5. The pressure release device (12) of claim 1 in which said porous body (24) is a composite made of randomly oriented fibers.

6. The pressure release device (12) of claim 5 in which fibers of said composite part have a diameter of at least 70 micrometers and maximally 130 micrometers.

7. The pressure release device (12) of claims 5 in which said porous body (24) has a porosity (P) of at least 60 percent to maximally 80 percent.

8. The pressure release device (12) of claims 5 in which said porous body (24) has pores of a diameter of at least 80 micrometers to maximally 250 micrometers.

9. The pressure release device (12) of claims 1 in which said porous body (24) is made of sintered powder material.

10. The pressure release device (12) of claim 9 in which said porous body (24) has a porosity (P) of at least 45 percent to maximally 60 percent.

11. The pressure release device (12) of claim 9 in which said porous body (24) has pores of a diameter of at least 50 micrometers to maximally 100 micrometers.

12. The pressure release device (12) of claim 1 in which the porous body (24) has a thickness (D) of at least 5 mm in a passage direction (R).

13. The pressure release device (12) of claim 1 in which the porous body (24) consists of temperature-resistant material.

14. The pressure release device (12) of claim 1 in which the porous body (24) has a porosity (P) which decreases radially outwardly with respect to said passage.

15. The pressure release device (12) of claim 1 including an axial stop (42, 46, 48) for said porous body (24) arranged in or at the passage (22).

16. An explosion protected housing (10) with flame proof encapsulation comprising:
an accommodating body (18) having a passage (22) extending through the accommodating body (18) that defines a ring shaped mating surface (34) extending through the accommodating body (18),
a porous body (24) made of a material that defines pores throughout arranged in the passage (22),
said porous body (24) having an inner side assigned to an interior of said housing and an outer side assigned to a surrounding area of the housing,
said porous body providing a gas permeable connection between said inner side and outer side for permitting the passage of gas between the interior of said housing and the surrounding area,
said porous body (24) initially being oversized in relation to a radial direction to the ring shaped mating surface (34) of said passage (22) and mounted within said passage (22) with an interference fit against said mating surface (34) that radially deforms a perimeter of the porous body and facilitates its retention in the passage (22) for preventing the passage of sparks and flames from an interior of the housing to the surrounding area both through the porous body and about a periphery thereof, and
said material of the porous body (24) being radially elastically deformed about its outer periphery in a direction at right angles to the mating surface (34) due to the interference fit such that an edge area (38) of the porous body (24) has a smaller porosity than a central area thereof.

17. The pressure relief device (12) of claim 16 in which said porous body (24) is a randomly oriented composite fiber part with fibers having a fiber diameter of at least 70 micrometers and maximally 130 micrometers, and said porous body (24) having a porosity (P) of at least 60 percent to maximally 80 percent.

18. The pressure relief device (12) of claim 16 in which the porous body (24) has a porosity (P) which decreases radially outwardly with respect to said passage.

19. A method for producing a pressure release device (12) for a protective housing (10) for flameproof enclosure of operating means which can form ignition sources, comprising the steps:
providing an accommodating body (18) having a passage (22) extending through the accommodating body (18) that defines a mating surface (34) that is ring-shaped in a peripheral direction,
providing a porous body (24) made of an elastically deformable material that defines pores throughout suitable for preventing the passage of sparks and flames from an interior of the housing to the surrounding area while permitting the passage of pressurized gas and which has an outer peripheral surface (30) that is oversized relative to the passage (22) of the accommodating body in a radial direction at right angles to an outer peripheral surface (30) of the porous body (24), and
arranging the porous body (24) in the passage (22) such that the outer peripheral surface (30) rests against the mating surface (34) along the mating surface (34) with an interference fit that partially elastically radially deforms the material of the porous body (24) to reduce the radial dimension of the porous body (24) at right angles to the outer peripheral surface (30) such that an outer peripheral edge area (38) of the porous body (24) has a smaller porosity than a central area thereof.

* * * * *